(12) United States Patent  
Inomori et al.

(10) Patent No.: US 7,882,917 B2
(45) Date of Patent: Feb. 8, 2011

(54) MOTORCYCLE

(75) Inventors: Toshinori Inomori, Shizuoka (JP); Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 197 days.

(21) Appl. No.: 12/173,018

(22) Filed: Jul. 14, 2008

(65) Prior Publication Data

US 2009/0038871 A1 Feb. 12, 2009

(30) Foreign Application Priority Data

Aug. 8, 2007 (JP) ............................. 2007-206170
Oct. 26, 2007 (JP) ............................. 2007-278622

(51) Int. Cl.
*B62D 61/02* (2006.01)
(52) U.S. Cl. ..................... 180/219; 180/230; 180/218
(58) Field of Classification Search ................. 180/219, 180/230, 218
See application file for complete search history.

(56) References Cited

U.S. PATENT DOCUMENTS

| 2,128,980 | A | * | 9/1938 | Anderton | ............... | 192/105 BA |
| 4,492,284 | A | * | 1/1985 | Hayashi | ..................... | 180/219 |
| 5,101,924 | A | * | 4/1992 | Yamagiwa et al. | .......... | 180/220 |
| 6,533,056 | B1 | | 3/2003 | Maimone | | |
| 7,014,026 | B2 | * | 3/2006 | Drussel et al. | .......... | 192/105 B |
| 7,108,114 | B2 | * | 9/2006 | Mori et al. | ................. | 192/48.5 |
| 7,111,715 | B2 | * | 9/2006 | Omata et al. | ................... | 192/16 |
| 7,284,523 | B2 | * | 10/2007 | Fukuzawa et al. | ...... | 123/179.25 |
| 7,487,853 | B2 | * | 2/2009 | Ishida et al. | ................. | 180/219 |
| 7,644,794 | B2 | * | 1/2010 | Usukura et al. | ............. | 180/219 |
| 2002/0033295 | A1 | * | 3/2002 | Korenjak et al. | ............. | 180/292 |

FOREIGN PATENT DOCUMENTS

JP 7-34916 2/1995

* cited by examiner

*Primary Examiner*—Joanne Silbermann
*Assistant Examiner*—Marlon A Arce
(74) *Attorney, Agent, or Firm*—Dickstein Shapiro LLP

(57) ABSTRACT

A motorcycle is provided with a vehicle body, front and rear wheels, an engine and a power transmission mechanism for connecting the engine to the rear wheel. A centrifugal clutch and a transmission having a plurality of gears are arranged in the power transmission mechanism. A handle is provided on the vehicle body. An accelerator grip is provided on the right side of the handle and a clutch lever is provided on the left side. A shift pedal for changing the transmission gear ratio of the transmission and a side stand are provided on the left side of the vehicle body. A rear brake pedal for braking the rear wheel is provided on the right side of the vehicle body. The motorcycle is also provided with a rotation suppression mechanism for suppressing the rotation of the rear wheel at least when the engine is stopped.

23 Claims, 11 Drawing Sheets

MOTORCYCLE

PRIORITY INFORMATION

This patent application is based on and claims priority under 35 U.S.C. §119 to Japanese Patent Application No. 2007-206170, filed on Aug. 8, 2007 and Japanese Patent Application No. 2007-278622, filed on Oct. 26, 2007, the entire contents of which are hereby expressly incorporated by reference.

TECHNICAL FIELD

The present invention relates to motorcycles.

BACKGROUND ART

Motorcycles provided with a so-called manual transmission mechanism have been known for some time. A motorcycle of this type is described, for example, in Japanese Patent No. 07-034916, published on Feb. 3, 1995. Generally, a motorcycle of this type is provided with an accelerator grip on the right side of a handle, a front brake lever on the right side of the handle, a clutch lever on the left side of the handle, a shift pedal disposed near a left side footstep, and a rear brake pedal disposed near a right side footstep. When a rider desires to shift gears, the rider grasps a clutch lever and operates the shift pedal by foot while manipulating an accelerator grip to change the gear ratio of the motorcycle transmission.

The motorcycle is usually provided with a side stand. When parking the motorcycle, the side stand is extended to prevent the motorcycle from tipping over. The sequence of parking steps typically include stopping the engine, carrying out a so-called "gear-in" state of the transmission, and extending the side stand. The use of the term "gear-in" means that the transmission is not brought into "neutral" but into a prescribed transmission gear ratio such as a first speed stage by meshing prescribed gears with one another and the clutch is engaged. Since the rear wheel of the motorcycle is difficult to rotate when the motorcycle is in the "gear-in" state, the side stand may be extended safely in a state in which longitudinal movement of the motorcycle is suppressed. Thus, motorcycles provided with a manual transmission mechanism can be stood on the side stand in a state where the longitudinal movement of the motorcycle is suppressed. Thus, the motorcycle has excellent parking convenience.

Motorcycles having a manual transmission mechanism and an added centrifugal clutch have become known more recently. A motorcycle of this type is described, for example, in U.S. Pat. No. 6,533,056 B1. When the rotational speed of the engine of a motorcycle of this type is smaller than a prescribed rotation speed, the centrifugal clutch is automatically disengaged. Therefore, it is unnecessary to operate the clutch lever or the like during "start" and "stop" procedures. The operational burden on the motorcycle rider during a "start" or "stop" procedure is, therefore, reduced. In this case, however, even though the motorcycle is provided with the manual transmission mechanism, the "gear-in" state cannot be achieved during parking. Consequently, the motorcycle side stand cannot be extended after a "gear-in" state is achieved.

In view of the foregoing, it is an object of the present invention to reduce the operational burden on a rider of a motorcycle provided with a manual transmission mechanism and a centrifugal clutch so as to enhance parking convenience for the motorcycle rider.

SUMMARY

A motorcycle according to one embodiment of the present invention includes a vehicle body, a front wheel provided on a front side of the vehicle body, a rear wheel provided on a rear side of the vehicle body, a drive source, a power transmission mechanism for connecting the drive source to the rear wheel, a centrifugal clutch arranged in the power transmission mechanism, a transmission having a plurality of gears and arranged in the power transmission mechanism, a handle provided on the vehicle body, an accelerator grip provided on a right side of the handle, a front brake lever provided on a right side of the handle and operated when the front wheel is braked, a clutch lever provided on a left side of the handle and operated when the centrifugal clutch is connected and disconnected, a shift pedal provided on a left side of the vehicle body and operated when a transmission gear ratio of the transmission is changed, a rear brake pedal provided on a right side of the vehicle body and operated when the rear wheel is braked, a side stand provided on the vehicle body, and a rotation suppression mechanism configured to suppress the rotation of the rear wheel at least when the drive source is stopped.

In the above-described motorcycle, the centrifugal clutch is provided in the power transmission mechanism. Therefore, in the motorcycle, the operation of the clutch lever during motorcycle "start" and "stop" procedures is unnecessary. Thereby, the operational burden on the rider can be reduced. On the other hand, the motorcycle is provided with the rotation suppression mechanism. The rotation suppression mechanism suppresses the rotation of the rear wheel during parking. Therefore, according to the motorcycle, the side stand can be extended in a state where the longitudinal movement of the vehicle body is suppressed. Thereby, the parking convenience of a motorcycle with a centrifugal clutch can be enhanced. Therefore, the motorcycle can reduce the operational burden on a rider of a motorcycle provided with a manual transmission mechanism and enhance the convenience for the rider during parking.

In accordance with another aspect of the present invention, a motorcycle is provided that includes a drive source, a power transmission mechanism for operatively connecting the drive source to a rear wheel, and a centrifugal clutch operatively arranged in the power transmission mechanism to automatically engage when the rotational speed of an input member is greater than or equal to an engagement rotational speed and automatically disengage when the rotational speed is less than the engagement speed. Moreover, a transmission having a plurality of gears is operatively arranged in the power transmission mechanism to provide a plurality of predefined gear ratios, a clutch actuation member is operatively connected to the centrifugal clutch for manually disengaging and engaging the centrifugal clutch when the rotational speed of the input member is greater than or equal to the first rotational speed, and a shift pedal is provided on a left side of a vehicle body, wherein the shift pedal is operatively connected to the transmission for changing the gear ratio. The motorcycle of the present aspect also includes a side stand provided on a side of the vehicle body and a rotation suppression mechanism configured to suppress rotation of the rear wheel at least when the drive source is stopped. The rotation suppression mechanism included in the motorcycle according to the present aspect of the invention does not include a rear brake foot pedal.

Because the centrifugal clutch is automatically connected and disconnected according to the rotational speed of the drive source during a vehicle "start" or "stop" procedure, it is unnecessary for a rider to operate the clutch lever during either of these phases. Further, because the rotation suppression mechanism suppresses the rotation of the rear wheel during parking the side stand of the motorcycle can be safely extended in a state where the longitudinal movement of the motorcycle is suppressed.

DETAILED DESCRIPTION

Hereinafter, a motorcycle 1 provided with a manual transmission mechanism in accordance with an embodiment of the present invention is described in detail with reference to FIGS. 1-7. However, motorcycle 1 is a mere exemplification of a preferred embodiment of a motorcycle according to the present invention. The present invention is not limited to motorcycle 1 described below. A motorcycle according to the present invention may be, for example, any straddle-type vehicle such as an off-road type motorcycle or the like. Accordingly, in this specification, the term "motorcycle" refers not only to a so-called narrowly-defined "motorcycle," but also to a broadly-defined motorcycle including an off-road vehicle or the like.

Embodiment 1

Figure 1:
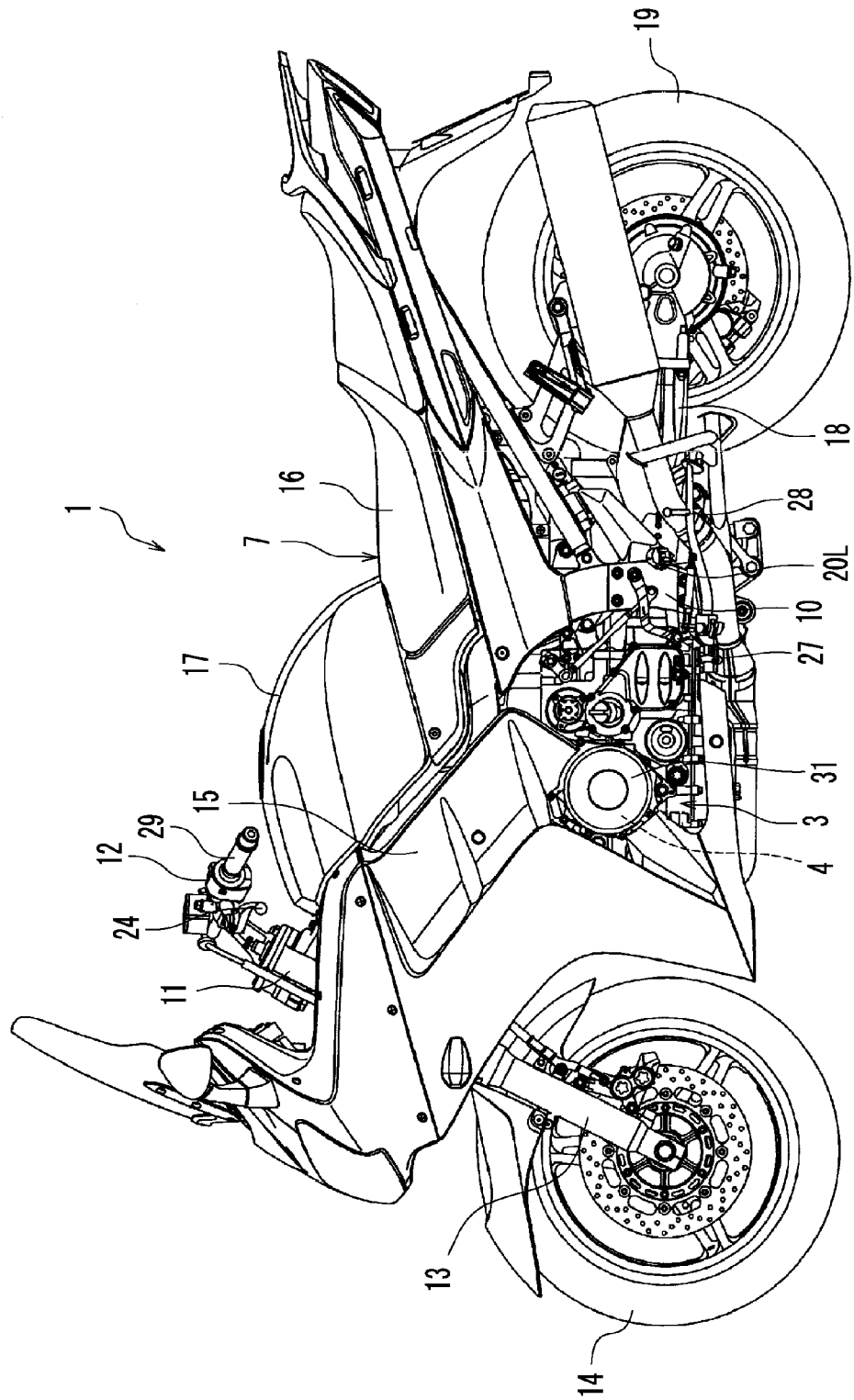
FIG. 1 is a left side view of a motorcycle according to an embodiment of the present invention.

FIG. 1 is a left side view of motorcycle 1 according to a first embodiment. In the following description, the terms "front," "back," "left" and "right" refer to those directions viewed from the perspective of a rider occupying motorcycle seat 16 unless otherwise specified.

Schematic Constitution of Motorcycle 1

As shown in FIG. 1, the motorcycle 1 is provided with a vehicle body 7, a front wheel 14 provided on the front side of the vehicle body 7 and a rear wheel 19 provided on the rear side of the vehicle body 7. The vehicle body 7 is provided with a vehicle body frame 10. The vehicle body frame 10 has a head pipe 11. A handle 12 is attached to the upper end part of the head pipe 11. On the other hand, the front wheel 14 is rotatably attached to the lower end of the head pipe 11 via a front fork 13.

A power unit 3 is suspended on the vehicle body frame 10. A vehicle body cover 15 is attached to the vehicle body frame 10. At least a portion of the upper part of the vehicle body frame 10 is covered with the vehicle body cover 15. The seat 16 is arranged on the rear side of almost the center part of the vehicle body 7 in the front and back directions. A fuel tank 17 is arranged on the front side of the seat 16.

A rear arm 18 is swingably supported by the rear half part of the vehicle body frame 10. The rear wheel 19 is rotatably attached to the rear end part of the rear arm 18. The rear wheel 19 is connected to an engine 4 (see FIG. 3), to be described later, via a power transmission mechanism including centrifugal clutch 2 and transmission 5. Thereby, the power of the engine 4 is transmitted to the rear wheel 19 to rotate the rear wheel 19.

The motorcycle 1 is provided with a rotation suppression mechanism 50 (see FIG. 4) for suppressing the rotation of the rear wheel 19 at least when the engine 4 (to be described later) is stopped. The detailed constitution of the rotation suppression mechanism 50 will be described later.

Figure 2:
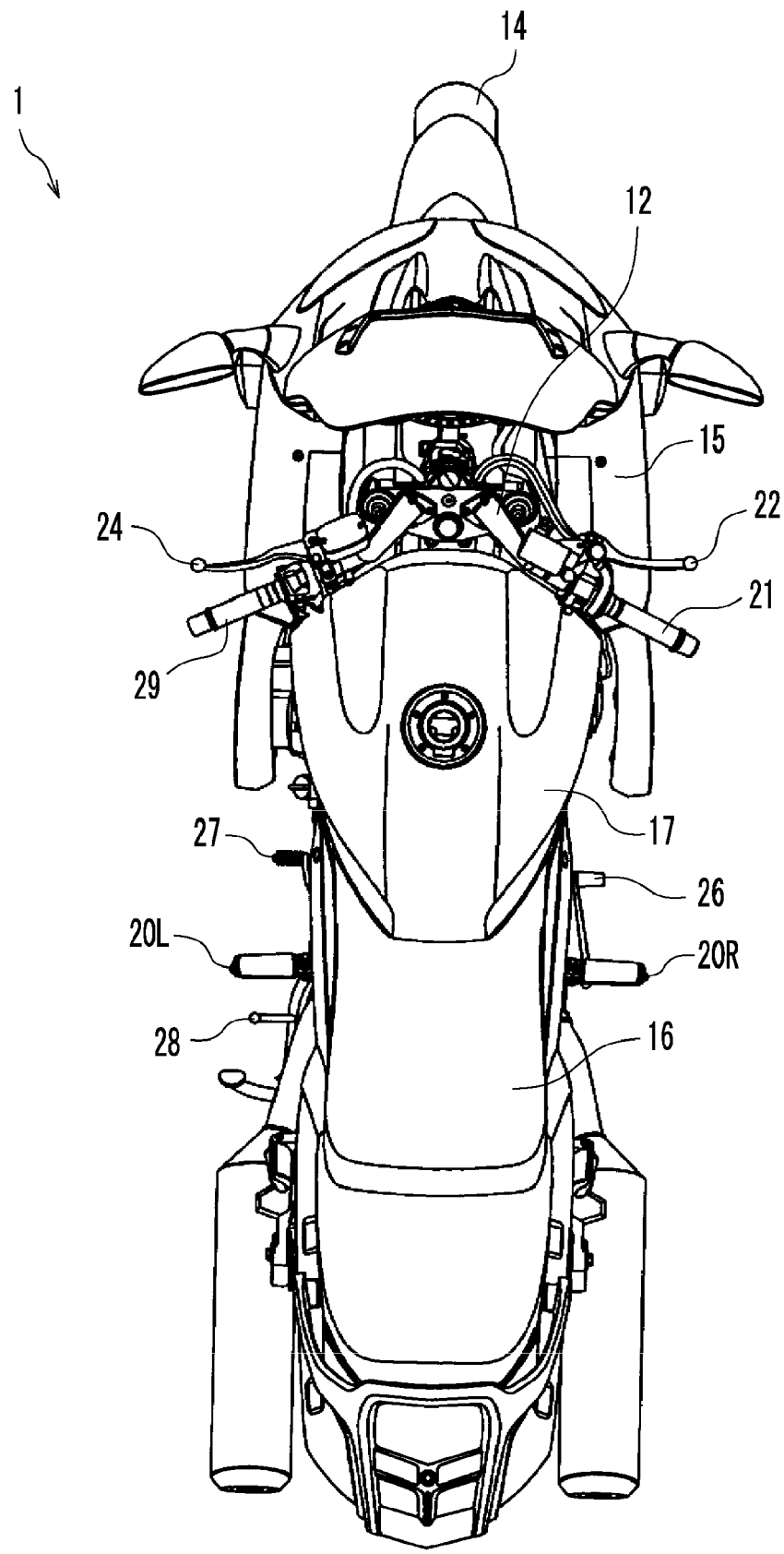
FIG. 2 is a top plan view of the motorcycle shown in FIG. 1.

As shown in FIG. 2, an accelerator grip 21 is provided on the right side of the handle 12. A front brake lever 22, which is operated when braking the front wheel 14, is provided on the front side of accelerator grip 21 and on the right side of the handle 12. On the other hand, a left side grip 29 is provided on the left side of the handle 12. A clutch actuation member, such as clutch lever 24 in the present embodiment, is operatively connected to the centrifugal clutch 2 (see FIG. 3) as described later and is provided on the front side of the left side grip 29 and on the left side of the handle 12. The clutch lever 24 is provided for manually disengaging and engaging the centrifugal clutch 2 when the rotational speed of the centrifugal clutch 2 is sufficient to automatically engage the clutch.

Footrests 20L and 20R are provided at a central part in the longitudinal direction of both the right and left sides of the vehicle body 7. A rear brake pedal 26, operated when braking the rear wheel 19, is provided slightly forward of the footrest 20R on the right side of the vehicle body 7. On the other hand, a shift pedal 27, which is operated when changing the transmission gear ratio of the transmission 5 to be described later, is provided slightly forward of the left side footrest 20L on the left side of the vehicle body 7. As shown in FIG. 1, a side stand 28 extending rearward is provided below the shift pedal 27 and the footrest 20L on the left side of the vehicle body 7. The side stand 28 may be directly or indirectly attached to the vehicle body 7. The side stand 28 may be attached, for example, to the vehicle body frame 10, and may be attached to the power unit 3.

Power Unit 3

Figure 3:
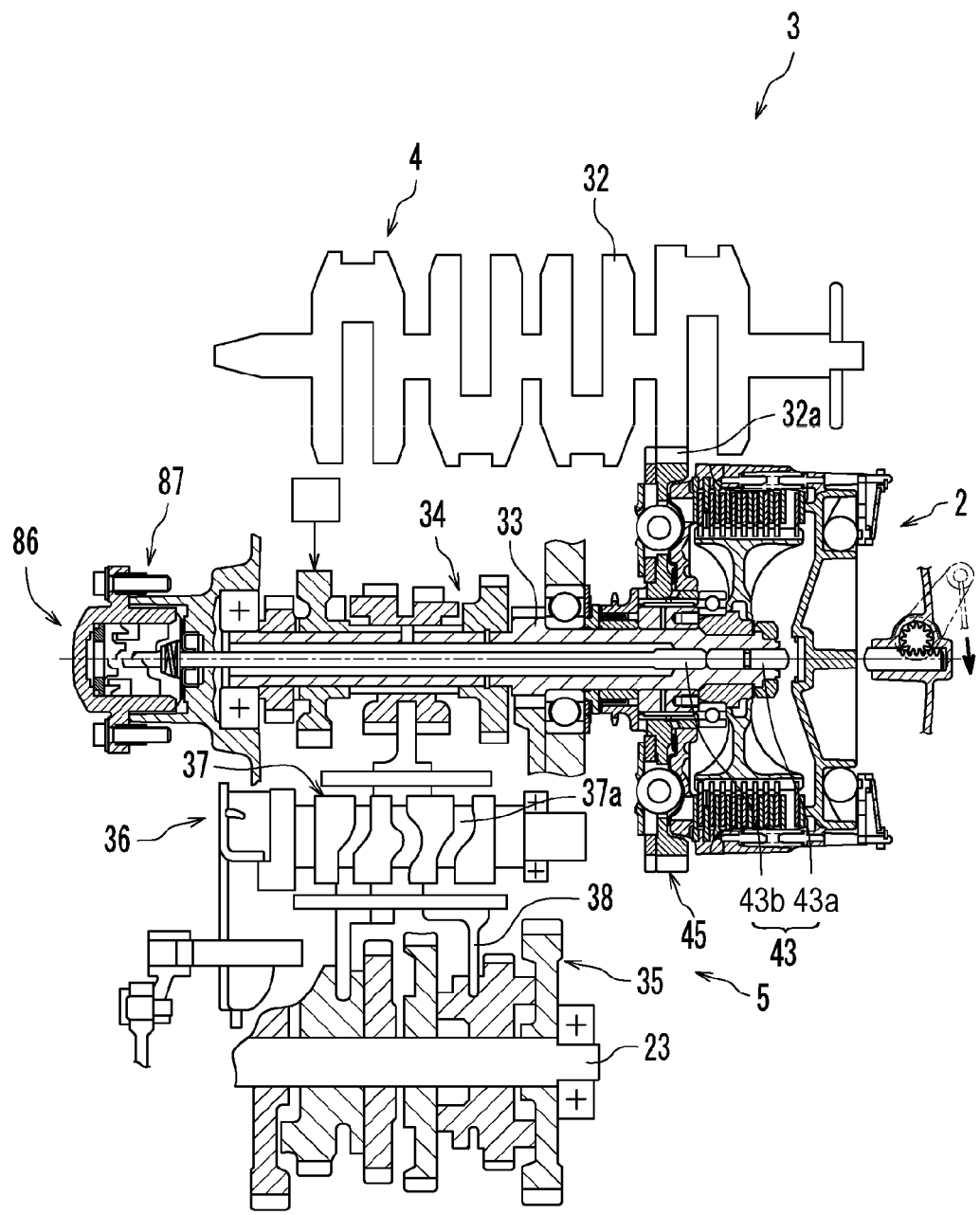
FIG. 3 is a sectional view of a main part of the power unit of the motorcycle shown in FIG. 1.

Next, the constitution of the power unit 3 will be described in detail with reference to FIG. 3. As shown in FIG. 3, the power unit 3 is provided with engine 4, transmission 5 and a clutch 2. The kind of engine used is not particularly limited in the present invention. In this embodiment, an example in which the engine 4 is a water cooled four cycle parallel four-cylinder engine will be described.

Engine 4

The engine 4 is arranged so that the cylinder shafts (which are not shown) extend slightly upward toward the forward part of the vehicle body. The engine 4 is provided with a crankcase 31 shown in FIG. 1 and a crankshaft 32. The crankshaft 32 is stored in the crankcase 31. The crankshaft 32 is arranged so as to extend in the vehicle width direction.

Transmission 5

As shown in FIG. 3, the crankshaft 32 is connected to the transmission 5 via the clutch 2. The transmission 5 is provided with a main shaft 33, a drive shaft 23 and a gear selection mechanism 36. The main shaft 33 is connected to the crankshaft 32 via the clutch 2. The main shaft 33 and the drive shaft 23 are respectively arranged substantially in parallel with the crankshaft 32.0p A plurality of multistage transmission gears 34 are attached to the main shaft 33. On the other hand, a plurality of transmission gears 35 corresponding to the multistage transmission gears 34 are attached to the drive shaft 23. Only the selected pair of gears of the plurality of transmission gears 34 and the plurality of transmission gears 35 is meshed with each other. At least one transmission gear 34 other than the selected transmission gear 34 of the plurality of transmission gears 34 and the transmission gears 35 other than the selected transmission gear 35 of the plurality of transmission gears 35 can be rotated with respect to the main shaft 33 or the drive shaft 23. That is, at least one of the transmission gears 34 which are not selected and the transmission gears 35 which are not selected idles with respect to the main shaft 33 or the drive shaft 23. That is, the rotation transmission between the main shaft 33 and the drive shaft 23 is carried out via only the selected transmission gear 34 and selected transmission gear 35 which are meshed with each other.

The selection of the transmission gears 34 and 35 is carried out by the gear selection mechanism 36. Specifically, the selection of the transmission gears 34 and 35 is carried out by a shift cam 37 of the gear selection mechanism 36. A plurality of cam grooves 37a are formed in the outer circumferential surface of the shift cam 37. A shift fork 38 is attached to each of the cam grooves 37a. Each of the shift forks 38 is engaged with prescribed transmission gears 34 and 35 of the main shaft 33 and drive shaft 23. By the rotation of the shift cam 37, each of the plurality of shift forks 38 is guided by a cam groove 37a to be moved in the axial direction of the main shaft 33. Thereby, the gears meshed with each other of the transmission gears 34 and 35 are selected. Specifically, only a pair of gears at a position corresponding to the rotation angle of the shift cam 37 of the plurality of transmission gears 34 and 35 are respectively in a fixed state due to a spline with respect to the main shaft 33 and the drive shaft 23. Thereby, the position of the transmission gear is determined, and the rotation transmission is carried out at a prescribed transmission gear ratio between the main shaft 33 and the drive shaft 23 via the transmission gears 34 and 35. This gear selection mechanism 36 is operated by the shift pedal 27 shown in FIG. 1.

In this constitution, the pair of prescribed transmission gears 34 and 35 are fixed to the main shaft 33 and the drive shaft 23, and the engine 4 is driven in a state where the clutch 2 is connected. Thereby, the power of the engine 4 is rotatably transmitted to the main shaft 33 via the clutch 2. The rotation transmission is carried out at a prescribed transmission gear ratio between the main shaft 33 and the drive shaft 23 via the pair of prescribed transmission gears 34 and 35, and the drive shaft 23 is rotatably driven. When the drive shaft 23 is rotatably driven, transmission of rotational power to the rear wheel 19 is carried out by a transmission mechanism (not shown) such as a chain for connecting the drive shaft 23 to the rear wheel 19 to rotate the rear wheel 19. In this embodiment, the power transmission mechanism according to the present invention which connects the engine 4 to the rear wheel 19 is constituted by the clutch 2, the transmission 5 and the transmission mechanism (not shown) such as the chain.

Clutch 2

In this embodiment, the clutch 2 is constituted by a wet multiple disk type friction clutch. The clutch 2 is constituted by a centrifugal clutch thereby eliminating the need to operate the clutch lever 24 during a "start" or "stop" procedure. The clutch 2 can be connected and disconnected by a rider's operation. Hereinafter, the constitution of the clutch 2 will be described in detail with reference to FIGS. 3, 4 and 5.

Clutch Housing 46

Figure 4:
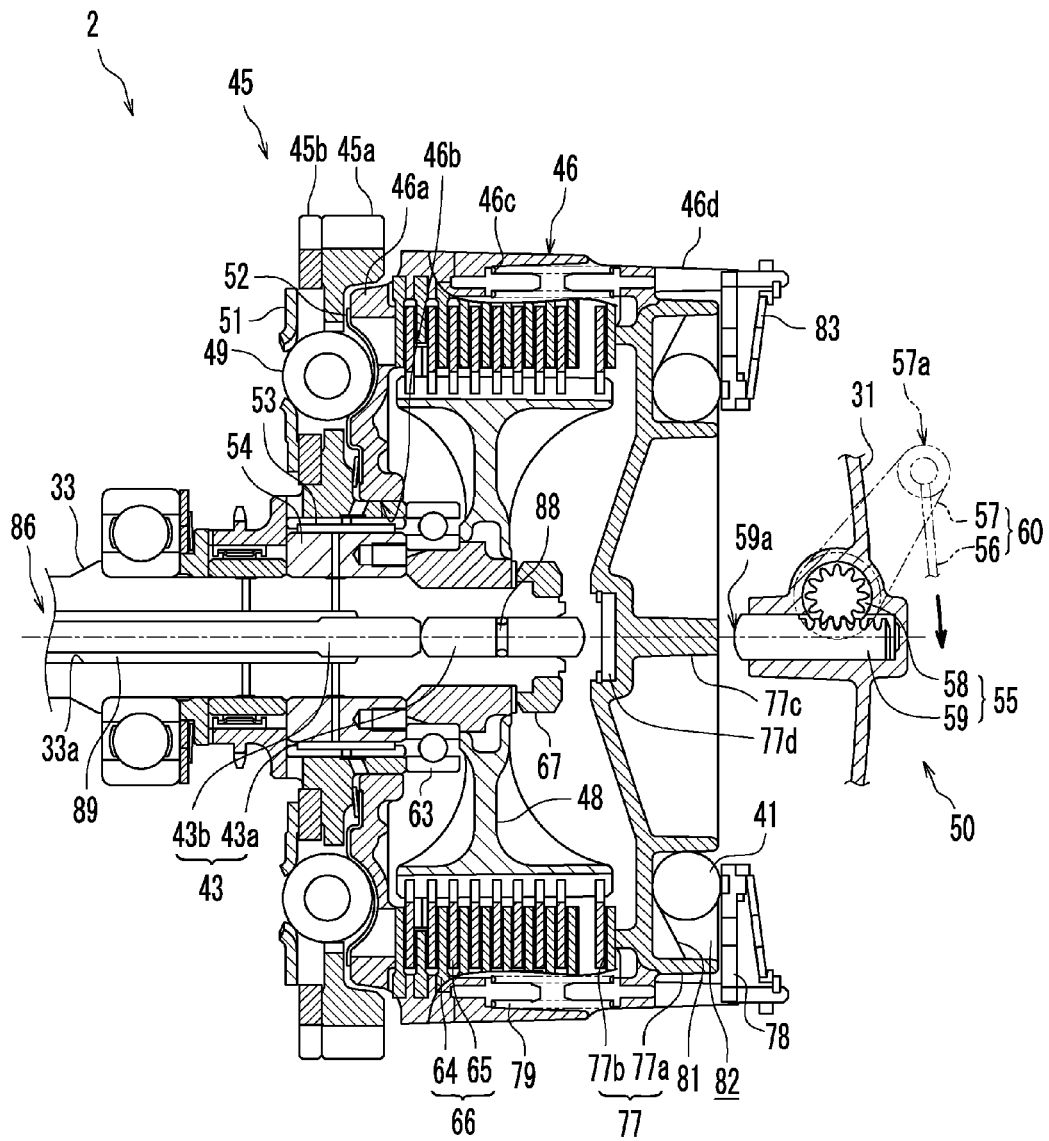
FIG. 4 is an enlarged sectional view showing a clutch and a rotation suppression mechanism of the power unit of FIG. 3.

As shown in FIG. 4, the clutch 2 is provided with the clutch housing 46. The main shaft 33 is made to penetrate through the clutch housing 46. The clutch housing 46 has a housing body 46c. The housing body 46c, which has one end closed by a bottom part 46a, is formed into a cylindrical shape. An insertion hole 46b, into which the main shaft 33 is inserted, is formed in the bottom part 46a. A plurality of pairs of arms 46d are provided on the housing body 46c. Each of the arms 46d is formed so as to project toward the inside from the inner circumferential surface of the housing body 46c in a radial direction. Each of the arms 46d extends toward the outside from the bottom part 46a in a vehicle width direction.

Scissors Gear 45

The scissors gear 45 is attached to the clutch housing 46. The scissors gear 45 is provided with two gears 45a and 45b, a spring 49 and two plates 51 and 52. The gears 45a and 45b are located between these two plates 51 and 52. The plates 51 and 52 are fixed to each other by a fixing means such as rivets and screws or the like with respect to the axial direction of the main shaft 33. Thereby, the gears 45a and 45b are fixed to each other substantially with respect to the axial direction of the main shaft 33. On the other hand, the gears 45a and 45b can be mutually rotated with respect to the direction of rotation.

The teeth number of the gear 45a is equal to that of the gear 45b. The gears 45a and 45b are arranged so that the teeth of the gears 45a, 46b are alternately located with respect to the circumferential direction. The spring 49 is provided between the gears 45a and 45b. Therefore, squeeze torque is applied to the gears 45a and 45b by the spring 49. Thereby, the variable torque of the engine 4 is absorbed.

The gear 45a of the scissors gear 45 is meshed with a gear 32a of the crankshaft 32 (see FIG. 3). The gear 45a of the scissors gear 45 is non-rotatably fixed relative to a bottom part 46a of the clutch housing 46. By this constitution, the gear 45a of the scissors gear 45 and the clutch housing 46 are integrally rotated with the rotation of the crankshaft 32.

A needle bearing 53 and a spacer 54, which are non-rotatably fixed to the main shaft 33, are arranged between the scissors gear 45 and the main shaft 33. The scissors gear 45 can be rotated with respect to the main shaft 33 by this needle bearing 53. That is, the rotation of the scissors gear 45 is not directly transmitted to the main shaft 33.

Clutch Boss 48

The clutch boss 48 is non-rotatably fixed to the main shaft 33 by a nut 67. That is, the clutch boss 48 is rotated with the main shaft 33. A thrust bearing 63 is arranged between the clutch boss 48 and the scissors gear 45. Thereby, the scissors gear 45, the needle bearing 53, and the spacer 54 are regulated by the thrust bearing 63 so that they do not come close to the clutch boss 48 within a prescribed distance. The movement thereof to the side of the clutch boss 48 is regulated with respect to the axial direction of the main shaft 33.

Plate Group 66

A plurality of friction plates 64 are arranged inside the clutch housing 46. Each of the friction plates 64 is fixed to the clutch housing 46 with respect to the direction of rotation of the main shaft 33. Thereby, the friction plates 64 are rotated with the clutch housing 46. Each of the friction plates 64 can be displaced with respect to the axial direction of the main shaft 33. Thereby, the distance between the mutually adjacent friction plates 64 is variable.

The friction plates 64 are arranged in the axial direction of the main shaft 33. Clutch plates 65 are respectively arranged between the mutually adjacent friction plates 64. Each clutch plate 65 thus faces an adjacent friction plate 64. Each of the clutch plates 65 is fixed to clutch boss 48 with respect to the direction of rotation of the main shaft 33. Thereby, the plurality of clutch plates 65 are rotated with the clutch boss 48. Each of the clutch plates 65 can be displaced with respect to the axial direction of the main shaft 33. Thereby, the distance between the mutually adjacent clutch plates 65 is variable.

In this embodiment, the plate group 66 is constituted by the plurality of friction plates 64 and the plurality of clutch plates 65.

Pressure Plate 77

The pressure plate 77 is arranged outside of the main shaft 33 in the vehicle width direction. The pressure plate 77 is provided with a body part 77a and a pressing part 77b.

The body part 77a is formed into an approximately disk shape, and the outer side end part in the diameter direction of the body part 77a is engaged with the plurality of arms 46d. Thereby, the body part 77a cannot be rotated with respect to the clutch housing 46, and is rotated with the clutch housing 46. A plurality of offsprings 79 are provided between an outer side end part in the diameter direction of the body part 77a and the clutch housing 46. The plurality of offsprings 79 are arranged at equal spacings around the circumference of the clutch housing 46. The body part 77a is biased toward the outside of the vehicle in a vehicle width direction by the offsprings 79. That is, the pressure plate 77 is biased in a direction of being separated from the plate group 66 by the offspring 79.

The pressing part 77b, which is formed of a ring-shaped flat body, is attached to the outer circumferential part of the body part 77a so as to face the side of the plate group 66. The pressing part 77b is thus arranged so as to face the plate group 66.

On the other hand, a pressure receiving part 77c projecting toward the outside of the vehicle width direction is formed in the central part of the opposite surface to the plate group 66 of the body part 77a. The pressure receiving part 77c is pressed by a tip part 59a of a rack 59 of a pressing mechanism 55 (to be described later). Two annular projections extending in the circumferential direction so as to project in the axial direction of the main shaft 33 and a plurality of tapered projections extending in the radial direction of the body part 77a so as to project in the axial direction of the main shaft 33 are formed in the outer circumferential part of the opposite surface to the plate group 66 of the body part 77a. A plurality of spaces 82 are formed by the two annular projections extending in the circumferential direction and the plurality of tapered projections extending in the radial direction.

A plurality of cam surfaces 81, which are formed by the tapered projections formed in the outer surface of the body part 77a in the vehicle width direction, help define the plurality of spaces 82. The plurality of cam surfaces 81 are radially arranged around the axial center of the main shaft 33. Each of the cam surfaces 81 is formed so as to extend toward the outside of the vehicle in the vehicle width direction with increased distance from the rotational axis.

A roller retainer 78 is arranged outside the pressure plate 77 in the vehicle width direction. The roller retainer 78 is formed into a ring-belt shape when viewed from the axial direction of the main shaft 33. The roller retainer 78 faces a surface having the cam surface 81 of the pressure plate 77. Thereby, a space 82, which becomes narrower with increased radial distance from the axis of the main shaft 33, is formed by each of the cam surfaces 81 and the roller retainer 78.

An outer side end part in the diameter direction of the roller retainer 78 is engaged with the plurality of arms 46d as well as with the pressure plate 77. Thereby, the roller retainer 78 cannot be rotated with respect to the clutch housing 46. In other words, the roller retainer 78 is rotated with the clutch housing 46. On the other hand, with respect to the axial direction of the main shaft 33, the roller retainer 78 can be displaced with respect to the clutch housing 46.

The roller retainer 78 is biased to the inside in the vehicle width direction by a disc spring 83, which acts as a biasing member. In other words, the roller retainer 78 is biased to the side of the plate group 66 by the disc spring 83.

A plurality of roller weights 41 are arranged in the plurality of spaces 82. The roller weight 41 is revolved with the rotation of the clutch housing 46. When the centrifugal force, generated while the roller weight 41 is revolved, is more than the prescribed value, the pressure plate 77 is pressed to the side of the plate group 66.

Specifically, in an idling state, the rotational speed of the clutch housing 46 rotated with the crankshaft 32 and the scissors gear 45 is relatively low. Thereby, the centrifugal force which acts on the roller weight 41 is relatively small. Therefore, the roller weight 41 is located relatively inside. Therefore, the pressure plate 77 is located relatively on the right side by the biasing force of the offspring 79. As a result, the distance between the pressing part 77b of the pressure plate 77 and the bottom part 46a of the clutch housing 46 is relatively wide, and the plate group 66 is in a non-pressed contact state. Therefore, the rotation of the clutch housing 46 is not transmitted to the clutch boss 48.

When the rotational speed of the crankshaft 32 is relatively enhanced, the rotational speed of the clutch housing 46 also becomes relatively higher at the same time. Therefore, the centrifugal force which acts on the roller weight 41 is enlarged as the rotational speed of the clutch housing 46 is enhanced. When the centrifugal force, which acts on the roller weight 41, is more than the prescribed value, the roller weight 41 is moved to the outside. Therefore, the pressure plate 77 is pressed to the left side by the roller weight 41. When the component force (the component force in the axial direction of the main shaft 33) of the centrifugal force which acts on the pressure plate 77 becomes larger than the biasing force of the offspring 79, the pressure plate 77 is moved to the side of the plate group 66. Thereby, the plate group 66 is pressed and contacted, and the clutch 2 is in a connected state. When the roller weight 41 is moved to the outside, the roller weight 41 presses the roller retainer 78 to the outside of the vehicle width direction. Therefore, the disc spring 83 is elastically transformed. When the disc spring 83 is elastically transformed, the roller retainer 78 and the roller weight 41 are biased to the side of the plate group 66 by the natural restoring force of the disc spring 83.

Thus, when the plate group 66 is pressed and contacted and the clutch 2 is connected, the rotation of the clutch housing 46 is transmitted to the clutch boss 48 via the plate group 66. Thereby, the clutch boss 48 is rotated with the clutch housing 46.

On the other hand, when the rotational speed of the crankshaft 32 decreases from a state where the clutch 2 is connected, the centrifugal force, which acts on the roller weight 41, becomes lower. Therefore, the roller weight 41 is moved to the inside in the centrifugal direction. As a result, the pressure plate 77 is moved to the right side by the biasing force of the offspring 79, and the clutch 2 is disengaged.

Thus, in the motorcycle 1, the centrifugal clutch 2 is provided in the power transmission mechanism. Therefore, since the clutch 2 is automatically connected and disconnected according to the rotational speed of the engine 4 during the "start" and "stop" phases of operation of the motorcycle 1, the need to operate the clutch lever 24 is eliminated during these phases of operation. The operational burden on the rider of motorcycle 1 during the "start" and "stop" phases can thus be reduced.

Clutch Release Mechanism 86

The clutch release mechanism 86, which serves as a press contact release mechanism, is provided in the clutch 2 of this embodiment. The clutch release mechanism 86 forcibly releases the pressed contact state of the plate group 66 using a force applied by the rider of the motorcycle 1. The clutch release mechanism 86 enables the disengagement of the clutch 2 due to the manual operation of the rider of the motorcycle 1.

This embodiment describes an example in which the rider of the motorcycle 1 operates the clutch lever 24 (see FIG. 2), thereby applying the force applied to the clutch lever 24 to the clutch release mechanism 86 to forcibly release the pressed contact state of the plate group 66. However, the present invention is not limited thereto. For example, the rider of the motorcycle 1 may operate the clutch lever 24 (see FIG. 2), thereby operating a driving mechanism such as an oil pump separately provided to apply the force generated by the oil pump to the clutch release mechanism 86 and to forcibly release the pressed contact state of the plate group 66.

Figure 5:
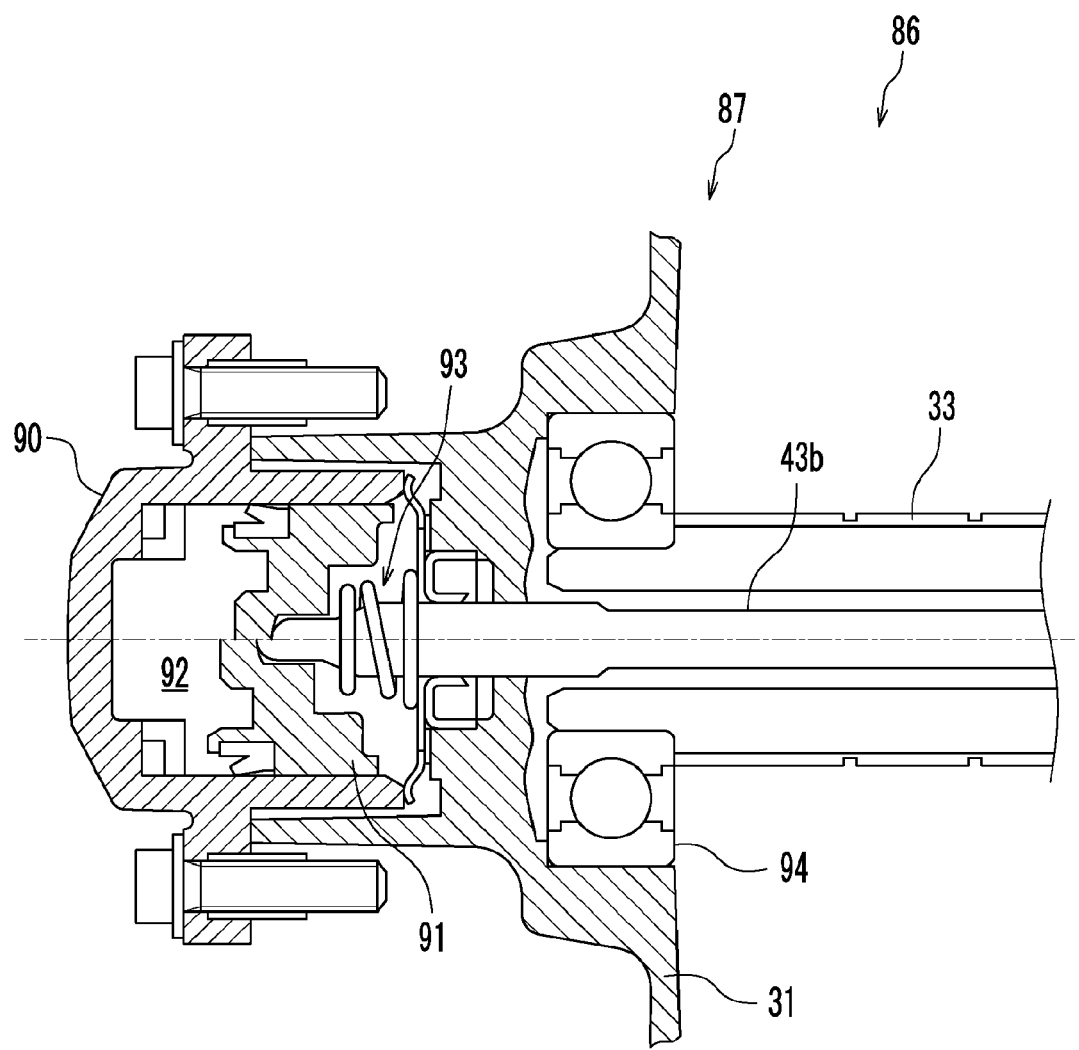
FIG. 5 is an enlarged sectional view showing a pushrod drive mechanism of the power unit of FIG. 3.

The clutch release mechanism 86 is provided with a pushrod 43 shown in FIGS. 3 and 4, and a pushrod driving mechanism 87 shown in FIGS. 3 and 5. As shown in FIG. 4, the pushrod 43 is arranged in a through-hole 33a formed in the main shaft 33. The through-hole 33a also serves as an oil supply hole for supplying oil to each of sliding parts or the like of the clutch 2. Specifically, oil is supplied to each of the sliding parts of the clutch 2 via a gap 89 between the inner wall of the through-hole 33a and the pushrod 43.

The pushrod 43 is provided with a short pushrod 43a and a long pushrod 43b. The short pushrod 43a is arranged outside in the vehicle width direction relative to long pushrod 43b. The right side end of the short pushrod 43a faces a receiving part 77d formed in the central part of the body of the pressure plate 77. An O ring 88 is attached approximately to the center part of the short pushrod 43a with respect to the axial direction. This prevents the oil supplied via the gap 89 from reaching the right side of the O ring 88 in the vehicle width direction. The short pushrod 43a is rotated with the main shaft 33 as a result of providing the O ring 88. On the other hand, the long pushrod 43b is not rotated with the main shaft 33. Thereby, when the main shaft 33 is rotated, the short pushrod 43a is rotated relative to the long pushrod 43b. In view of this constitution, the end surface of the short pushrod 43a on the side of the long pushrod 43b is formed into a curved surface projecting toward the side of the long pushrod 43b. Thereby, the sliding resistance between the short pushrod 43a and the long pushrod 43b is reduced when the short pushrod 43a is rotated relative to long pushrod 43b.

As shown in FIG. 3, the left side end of the long pushrod 43b is located on the left side end of the main shaft 33, and leads to the pushrod driving mechanism 87. FIG. 5 is a sectional view representing the pushrod driving mechanism 87. The part below the axial center of the main shaft 33 of FIG. 5 represents a state where the clutch release mechanism 86 is not driven. In other words, the part below the axial center of the main shaft 33 of FIG. 5 represents a state where the pushrod 43 is located relatively on the left side and the pressure plate 77 is not displaced to the right by the pushrod 43. On the other hand, the part above the axial center of the main shaft 33 of FIG. 5 represents a state where the clutch release mechanism 86 is driven. In other words, the part above the axial center of the main shaft 33 of FIG. 5 represents a state where the pushrod 43 is located relatively on the right side and the pressure plate 77 is displaced to the right by the pushrod 43.

As shown in FIG. 5, the pushrod driving mechanism 87 is provided with a cylinder 90 and a piston 91. The piston 91 can be slidably moved in the axial direction of the main shaft 33 with respect to the cylinder 90. The piston 91 is attached to the long pushrod 43b. Thereby, as the piston 91 is slidably moved, the long pushrod 43b is also respectively moved in the axial direction of the main shaft 33.

An actuation chamber 92 is defined and formed between the piston 91 and the cylinder 90. The actuation chamber 92 is filled with oil. The rider of the motorcycle 1 operates the clutch lever 24 to increase the internal pressure in the actuation chamber 92 (see FIG. 2). Thereby, the piston 91 and the long pushrod 43b are displaced to the right. In turn, the pressure plate 77 shown in FIG. 4 is pressed to the right and displaced to the right. As a result, the pressing part 77b of the pressure plate 77 is separated from the plate group 66 to release the pressed contact state of the plate group 66.

A compression coil spring 93 is arranged between the piston 91 and the crankcase 31. The piston 91 is biased to the left side by the compression coil spring 93. That is, the pushrod 43 is displaced to the left, and is biased in a direction corresponding to the clutch 2 being in a connected state. Thereby, when the operation of the clutch lever 24 (see FIG. 2) is released by the rider of the motorcycle 1, the pushrod 43 is certainly moved to the left side.

Rotation Suppression Mechanism 50 and Interlocking Mechanism 60

Next, the rotation suppression mechanism 50 and the interlocking mechanism 60 for interlocking the side stand 28 with the rotation suppression mechanism 50 will be described. As described above, the rotation suppression mechanism 50 suppresses the rotation of the rear wheel 19 (see FIG. 1) at least when the engine 4 is stopped. On the other hand, the interlocking mechanism 60 connects the side stand 28 to the rotation suppression mechanism 50, brings the rotation suppression mechanism 50 into an operative state when the side stand 28 is extended, and brings the rotation suppression mechanism 50 into an inoperative state when the side stand 28 is stored.

As shown in FIG. 4, in this embodiment, the rotation suppression mechanism 50 is provided with the pressing mechanism 55 for pressing the clutch 2 in a direction in which the clutch 2 is connected. In this embodiment, the pressing mechanism 55 is provided with the rack 59 for pressing the pressure receiving part 77c of the pressure plate 77 toward the inside in the vehicle width direction and a pinion gear 58 for pressing and pulling the rack 59 in the vehicle width direction. On the other hand, the interlocking mechanism 60 is provided with a wire 56 and a lever 57.

Figure 6A:
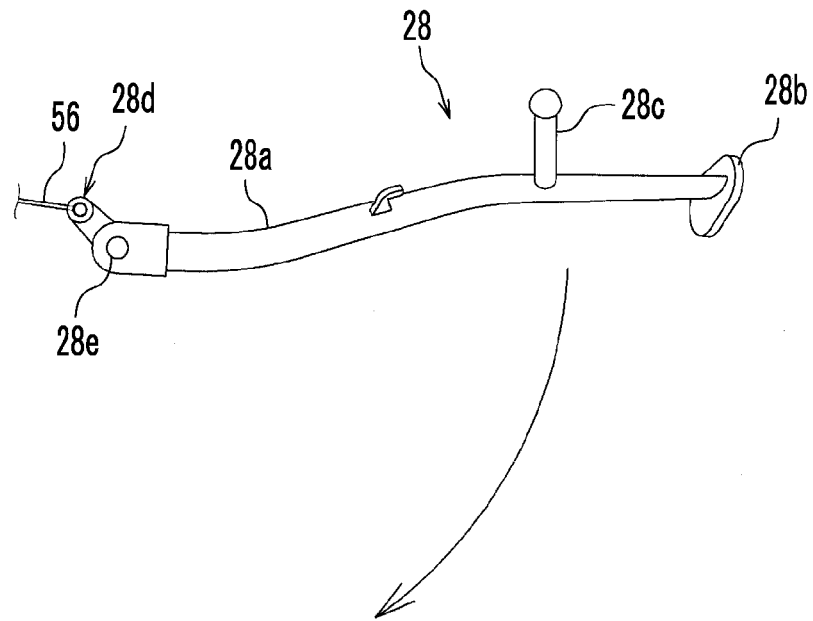
FIGS. 6(a) and 6(b) are views illustrating the operation of a side stand and associated interlocking mechanism of the motorcycle shown in FIG. 1.
Figure 6B:
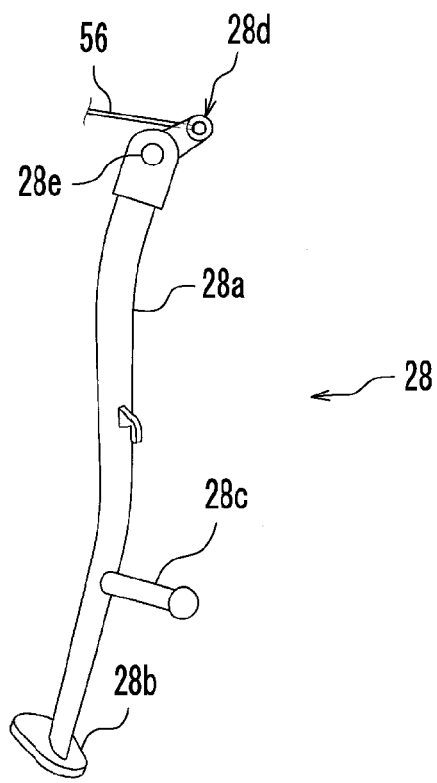

As shown in FIGS. 6a and 6b, the side stand 28 is provided with a supporting body 28a and a ground contact part 28b provided on one end of the supporting body 28a. A foot bar 28c is provided in an intermediate part of the supporting body 28a. One end of the wire 56 of the interlocking mechanism 60 is pin-connected to an end 28d of the supporting body 28a. The side stand 28 is swingably attached to the vehicle body frame 10 or the power unit 3 or the like by a pin 28e so that when the side stand is extended, the wire 56 is pulled by end 28d toward the rear of motorcycle 1.

As shown in FIG. 4, one end 57a of the lever 57 is pin-connected to the other end of the wire 56. The pinion gear 58 of the rotation suppression mechanism 50 is fixed to the other end of the lever 57. The pinion gear 58 is rotated with the swing of the lever 57. Corresponding sets of teeth are formed in each of the pinion gear 58 and the rack 59. The pinion gear 58 and the rack 59 are arranged so that the two sets of teeth are operatively meshed with one another. In this embodiment, the pinion gear 58 and the rack 59 are arranged so that the rack 59 is located relatively toward the outside in the vehicle width direction in the state shown in FIG. 4, where end 57a of the lever 57 is located relatively toward the front (upper side in FIG. 4) in the front and back directions of the motorcycle 1. Pinion gear 58 and rack 59 are also arranged so that the rack 59 is located relatively toward the inside in the vehicle width direction in the state shown in FIG. 7, where one 57a of the lever 57 is located relatively toward the rear (lower side in FIG. 7) of motorcycle 1.

Interlocking Operation of Side Stand 28 and Clutch 2

The constitution of the motorcycle 1 is described above. Next, the interlocking operation of the side stand 28, the rotation suppression mechanism 50 and the clutch 2 when the side stand 28 is extended so that the motorcycle is prevented from tipping over when parked will be described. Before the side stand 28 is extended, the engine 4 is stopped, and the prescribed transmission gears 34 and 35 are meshed with each other to be in a prescribed transmission gear ratio such as a first speed stage.

As shown in FIG. 6(a), when the side stand 28 is flipped up, the end 28d of the supporting body 28a of the side stand 28 is located relatively toward the front (left side in FIG. 6 (a)) with respect to the front and back directions of the motorcycle 1. Therefore, the wire 56, which has one end pin-connected to end 28d of the supporting body 28a, is also located relatively toward the front of motorcycle 1. Thereby, as shown in FIG. 4, end 57a of the lever 57 is also located relatively toward the front of motorcycle 1, and the rack 59 is located relatively toward the outside in the vehicle width direction. At this time, the tip part 59a (inner end part in the vehicle width direction) of the rack 59 is separated from (i.e. it is not in contact with) the pressure receiving part 77c of the pressure plate 77. Thereby, there is no biasing force applied to on the pressure plate 77 from the pressing mechanism 55 in this state.

On the other hand, as shown in FIG. 6(b), when the side stand 28 is extended, the supporting body 28a of the side stand 28 is swung about the pin 28e. Thereby, the ground contact part 28b, which is located on one end of the supporting body 28a, is forwardly and downwardly moved, and the other end 28d of the supporting body 28a is pivoted toward the back end of motorcycle 1.

Figure 7:
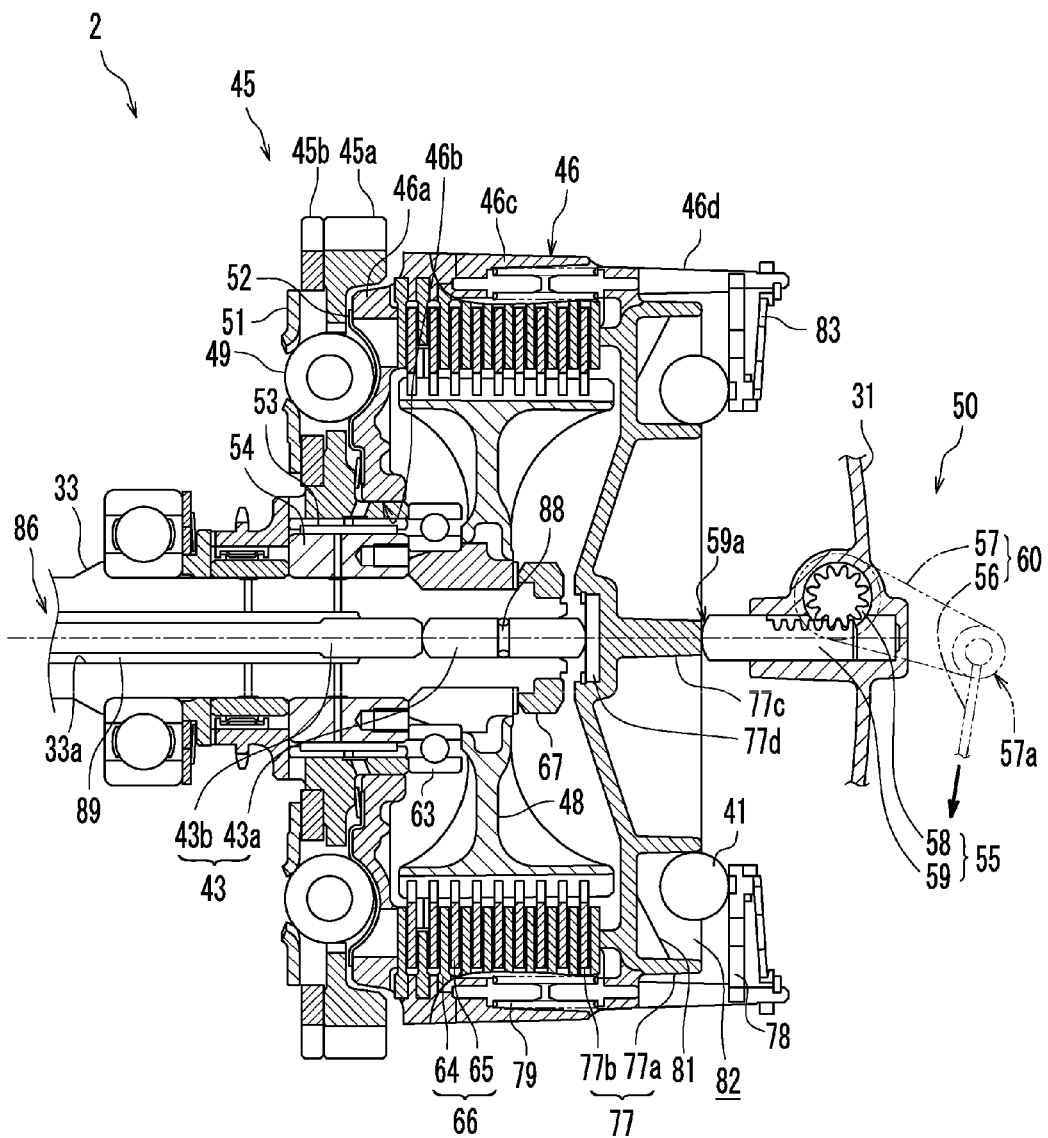
FIG. 7 is an enlarged sectional view showing the clutch and the rotation suppression mechanism with the rotation suppression mechanism in its operative state.

When the other end 28d of the supporting body 28a is pivoted toward the back end of motorcycle 1, the wire 56 is pulled toward the back of motorcycle 1 by the end 28d of the supporting body 28a. When the wire 56 is pulled toward the back of motorcycle 1, as shown in FIG. 7, end 57a of the lever 57 is also pulled to the rear side of motorcycle 1, and the lever 57 is swung about its pivot point. Thus, end 57a of the lever 57 is moved to the rear of motorcycle 1. The pinion gear 58 is rotated clockwise in FIG. 7. As a result, the rack 59, which has teeth meshed with the teeth of the pinion gear 58, is pushed inward in a vehicle width direction by the pinion gear 58.

When the rack 59 is pushed inward in the vehicle width direction by a prescribed distance, the tip part 59a (inner end part in the vehicle width direction) of the rack 59 will come into contact with the pressure receiving part 77c of the pressure plate 77. When the rack 59 is further pushed in the same direction, the pressure plate 77 is pressed inward in the vehicle width direction by the rack 59. When the force from the rack 59 which acts on the pressure plate 77 is larger than the biasing force of the offspring 79, the pressure plate 77 is moved to the side of the plate group 66. Thereby, the plate group 66 is pressed and contacted, and the clutch 2 is brought into a connected state. Thus, when the rotation suppression mechanism 50 is interlocked with the side stand 28 by the interlocking mechanism 60 and the side stand 28 is extended, the rotation suppression mechanism 50 presses the clutch 2 and forcibly brings the clutch 2 into a connected state.

When the clutch 2 is brought into a connected state, the rear wheel 19 is connected to the crankshaft 32 via the power transmission mechanism constituted by a transmission mechanism (not shown), the transmission 5 and the clutch 2. Thereby, the rear wheel 19 is difficult to rotate. Thus, the prescribed transmission gears 34 and 35 are meshed to bring the motorcycle 1 into the prescribed transmission gear ratio such as a first speed stage, and the side stand 28 is then extended to bring the clutch 2 into a connected state, and thereby the "gear-in" state of the transmission is carried out. More specifically, the "gear-in" state is carried out during the operation in which the side stand 28 is extended. In other words, the "gear-in" state is carried out until the operation in which the side stand 28 is extended is completed in the motorcycle 1, at which point the rotation of the rear wheel 19 is suppressed.

As described above, in the motorcycle 1, the centrifugal clutch 2 is provided in the power transmission mechanism. Therefore, the motorcycle 1 eliminates the need for operation of the clutch lever 24 during a "start" or "stop" procedure. Thereby, the operational burden on the rider is reduced. On the other hand, the motorcycle 1 is provided with the rotation suppression mechanism 50. Therefore, when the engine 4 is stopped and the side stand 28 is extended (more particularly, until the side stand 28 is fully extended), the rotation of the rear wheel 19 is suppressed by the rotation suppression mechanism 50. Therefore, the motorcycle 1 can be supported by the side stand 28 in a state where the longitudinal movement of the vehicle body 7 is suppressed. Thereby, parking convenience can be enhanced. Therefore, the motorcycle 1 can reduce the operational burden on the rider and enhance the convenience in parking.

In the motorcycle 1, the rotation suppression mechanism 50 has the pressing mechanism 55 for pressing the clutch 2 so as to achieve a connected state of the centrifugal clutch 2. The pressing mechanism 55 of the rotation suppression mechanism 50 brings the rotation suppression mechanism 50 into an operative state when the side stand 28 is extended to suppress the rotation of the rear wheel 19, and brings the rotation suppression mechanism 50 into an inoperative state when the side stand 28 is stored to release the rotation suppression state of the rear wheel 19. Thus, the motorcycle 1, which has a simple construction, can realize a rotation suppression mechanism 50 for suppressing the rotation of the rear wheel 19 at least when the engine 4 is stopped.

Embodiment 2

Figure 8:
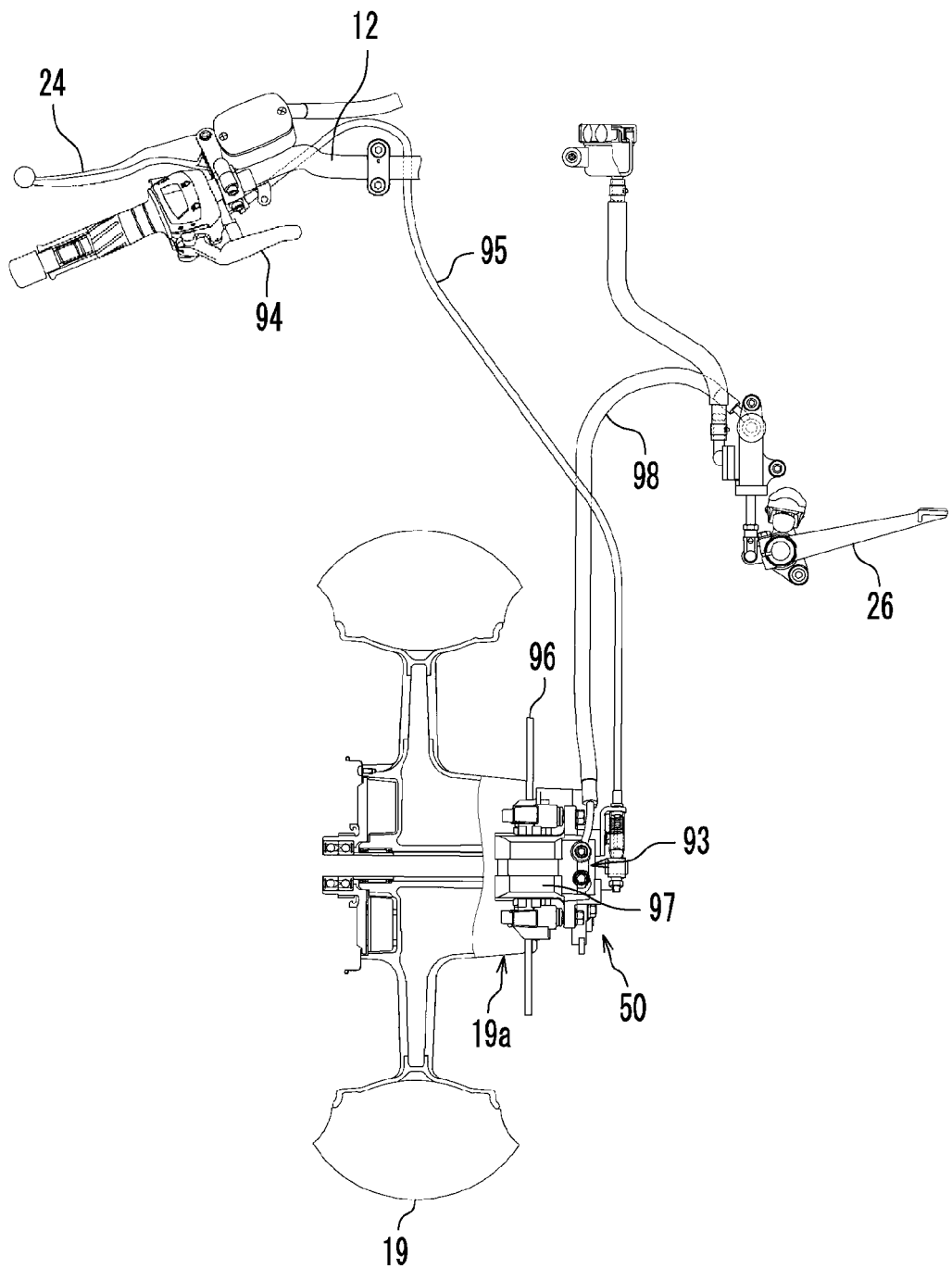
FIG. 8 is a schematic view showing a rotation suppression mechanism, switching lever, rear brake pedal and rear wheel of a motorcycle according to another embodiment.

In the motorcycle 1 according to Embodiment 1, the rotation suppression mechanism 50 is provided with the pressing mechanism 55 for pressing the clutch 2 to achieve a connected state of the clutch 2. As shown in FIG. 8, a motorcycle 1 according to Embodiment 2 is provided with a rotation suppression mechanism 50 that includes a rear wheel brake 93 for braking the rear wheel 19 in place of the pressing mechanism 55 of Embodiment 1. The motorcycle 1 according to Embodiment 2 is provided with a switching member, such as switching lever 94, for switching between the operative state and inoperative state of the rear wheel brake 93, and a pipe 95 for connecting the rear wheel brake 93 to the switching lever 94. Since the remaining construction of motorcycle 1 is almost the same as that of Embodiment 1, the description of the remaining construction is omitted. Hereinafter, only the different construction from Embodiment 1 will be described in detail.

Embodiment 2 adopts a disk brake driven by working fluid as the rear wheel brake 93. As shown in FIG. 8, the rear wheel brake 93 is provided with a disc rotor 96 attached to the end surface of a hub 19a of the rear wheel 19 by a plurality of bolts, and a caliper 97. The caliper 97 has a brake pad (not shown) for holding the disc rotor 96. The rear brake pedal 26 is also connected to the rear wheel brake 93 via a pipe 98, and the rear wheel brake 93 can be operated by the rear brake pedal 26.

The motorcycle 1 is provided with a master cylinder (not shown) which follows the operation of the switching lever 94. One end of the pipe 95 is connected to the master cylinder. On the other hand, the caliper 97 includes a caliper cylinder (not shown) and a brake pad (not shown). The other end of the pipe 95 is connected to the caliper cylinder. A piston in the caliper cylinder is moved to a "held" position in which the disc rotor 96 is held by the brake pad when the working fluid is supplied via the pipe 95 from the master cylinder. When the disc rotor 96 is held by the brake pad, the rotation of the rear wheel 19 is suppressed to brake the rear wheel 19.

Figure 9:
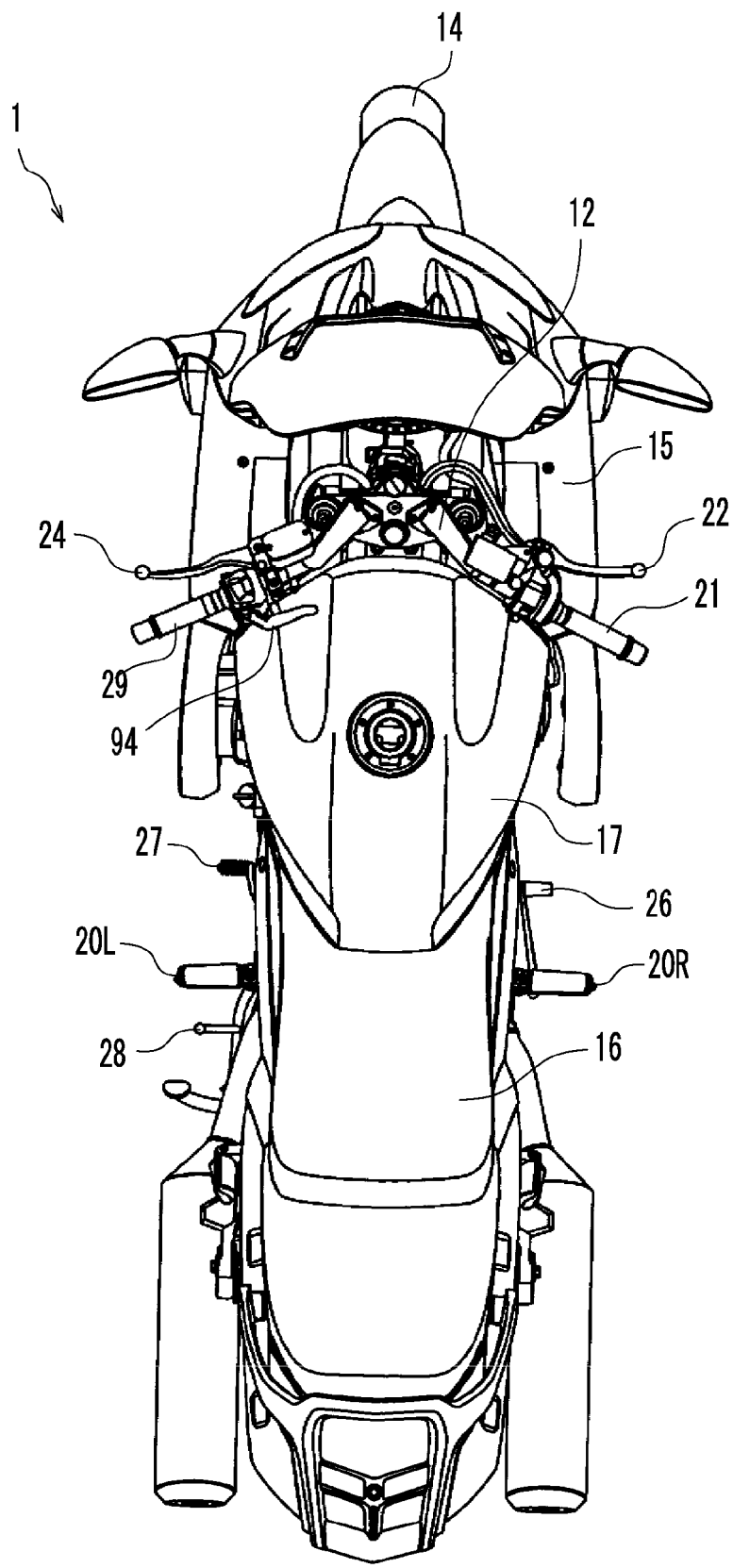
FIG. 9 is a top plan view of a motorcycle including the components shown in FIG. 8.
Figure 10A:
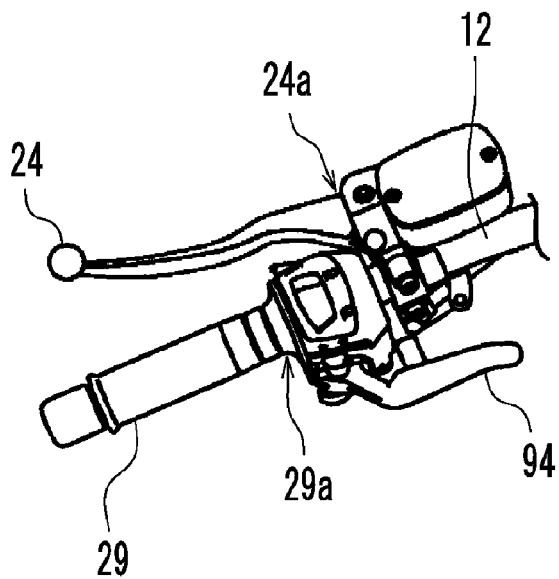
FIGS. 10(a) and 10(b) illustrate the operation of the switching lever.
Figure 10B:
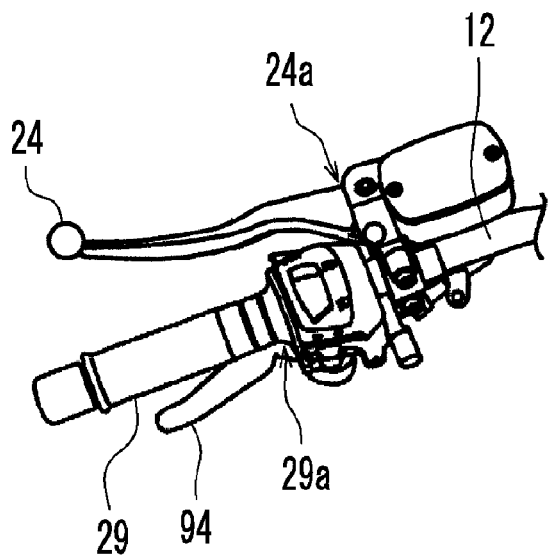

As shown in FIG. 9, the switching lever 94 is arranged on the left side of the center of the handle 12. As shown in FIGS. 10(a) and 10(b), the switching lever 94 is constituted so that the rotation of the switching lever can switch between the operative state and inoperative state of the rear wheel brake 93 of the rotation suppression mechanism 50. Furthermore, the switching lever 94 is arranged so that at least a part of the switching lever 94 is located on the left side of a right end 24a of the clutch lever 24 in at least one state (i.e., operative state or inoperative state) of the rear wheel brake 93 of the rotation suppression mechanism 50. The switching lever 94 is arranged so that when the rear wheel brake 93, constituting the rotation suppression mechanism 50, is in an inoperative state, the switching lever 94 is located on the right side of a right end 29a of the left side grip 29, which is provided on the left side of the handle 12 (see FIG. 10(a)), and when the rear wheel brake 93 is in an operative state, at least a part thereof is located on the left side of the right end 29a of the left side grip 29 (see FIG. 10(b)).

Figure 11:
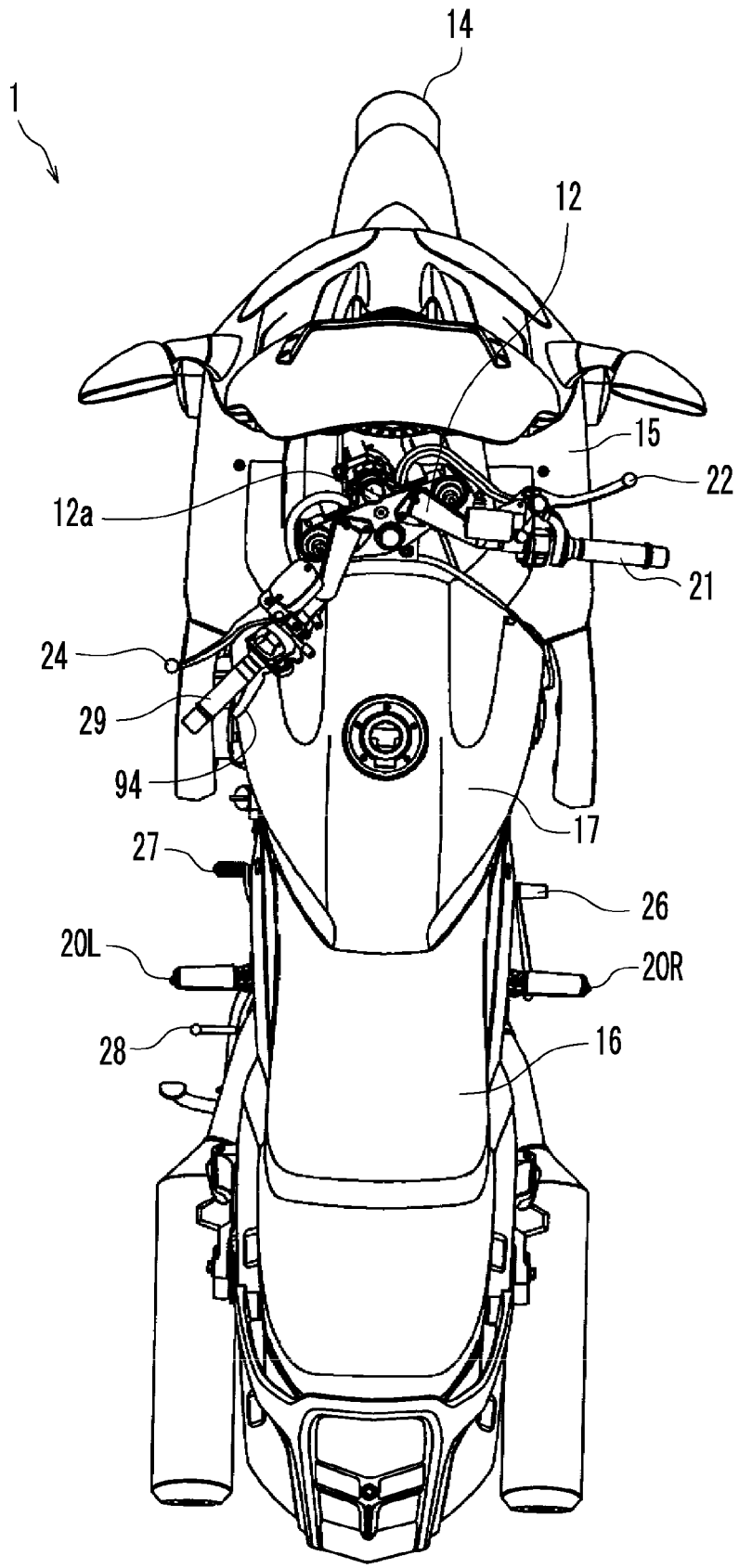
FIG. 11 is a top plan view of the motorcycle of FIG. 9 shown with the handle in a locked position.

The motorcycle 1 is further provided with a handle lock mechanism 12a. Thereby, as shown in FIG. 11, the motorcycle 1 can lock the handle 12 in a state where the handle 12 is rotated leftward. As shown in FIG. 11, in this embodiment, the switching lever 94 is formed so that the rotation trajectory of the switching lever 94 interferes with the vehicle body 7 in a state where the handle 12 is locked. Thereby, by locking the handle 12, the switching lever 94 can be locked so that the switching lever 94 cannot be rotated.

As described above, in the motorcycle 1 according to Embodiment 2, the rotation suppression mechanism 50 includes the rear wheel brake 93 for braking the rear wheel 19. Therefore, when the engine 4 is stopped and the side stand 28 is extended, the rear wheel brake 93 of the rotation suppression mechanism 50 can be brought into an operative state to suppress the rotation of the rear wheel 19. Thereby, the motorcycle 1 can also be supported by side stand 28 during parking in a state where the longitudinal movement of the vehicle body 7 is suppressed. Therefore, the motorcycle 1 according to Embodiment 2 can enhance the convenience in parking. As in Embodiment 1, the centrifugal clutch 2 is provided in the power transmission mechanism of the motorcycle 1 according to Embodiment 2. Therefore, the need for operation of the clutch lever 24 is eliminated during "start" and "stop" procedures. Thereby, the operational burden on the rider is reduced.

Therefore, the motorcycle 1 according to Embodiment 2 can also reduce the operational burden on the rider and enhance parking convenience.

The motorcycle 1 is provided with a switching member, such as the switching lever 94, for switching between an operative and inoperative state of the rear wheel brake 93 of the rotation suppression mechanism 50. The switching lever 94 is arranged on the left side of the center of handle 12, and is arranged on the opposite side of the accelerator grip 21. Thereby, the switching lever 94 can also be used for hill starts or the like.

Specifically, when the motorcycle 1 is stopped on a hill or the like, not the left leg, which operates the shift pedal 27, but the right leg is often attached to the ground. However, in a state where the right leg is attached to the ground, the rear brake pedal 26 cannot be operated, and a so-called hill start for carrying out the release operation of the rear wheel brake 93 cannot be carried out while the accelerator operation is carried out. However, the switching lever 94 is provided in this motorcycle 1. Therefore, even in a state where the right leg is attached to the ground in such a case, the release operation of the rear wheel brake 93 can be carried out by the left hand while the accelerator operation is carried out by the right hand. Therefore, a rider of motorcycle 1 can carry out a hill start using the switching lever 94, and enhance travel convenience.

In the motorcycle 1, the switching lever 94 is arranged so that at least a part of the switching lever 94 is located on the left side of a right end 24a of the clutch lever 24 in at least one of the operative and inoperative states of the rear wheel brake 93 of the rotation suppression mechanism 50. In other words, the switching lever 94 is arranged within a range where the switching lever 94 can be operated by the rider's left hand. In the embodiment, the switching lever 94 is arranged within a range where the switching lever 94 can be operated by the thumb of the left hand of the rider. Therefore, a rider of motorcycle 1 can easily operate the switching lever 94. Therefore, the switching lever 94 can be also operated in place of the rear brake pedal 26 during movement. Thereby, the motorcycle 1 can enhance the rider's convenience in parking and during movement.

The switching lever 94 is arranged so that when the rear wheel brake 93 constituting the rotation suppression mechanism 50 is in an inoperative state, the switching lever 94 is located on the right side of the right end 29a of the left side grip 29 provided on the left side of the handle 12, and when the rear wheel brake 93 is in an operative state, at least a part thereof is located on the left side of the right end 29a of the left side grip 29. Therefore, when the rear wheel brake 93 is in an operative state, the switching lever 94 hinders the rider from grasping the left side grip 29. Therefore, in the motorcycle 1, the rider is prevented from riding with the rear wheel brake 93 in an operative state by forgetting to switch of the switching lever 94 to the inoperative state.

The motorcycle 1 is further provided with the handle lock mechanism 12a for locking the handle 12 in a state where the handle 12 is rotated to the left. Further, in the state where the handle 12 is locked, the switching lever 94 of the motorcycle 1 is formed so that the rotation trajectory of the switching lever 94 interferes with the vehicle body 7. Thereby, the switching lever 94 can be locked by locking the handle 12 so that the switching lever 94 cannot be rotated. Therefore, the motorcycle 1 can prevent the switching lever 94 from being accidentally switched to release the rear wheel brake 93 when the handle is locked.

In each of the above embodiments, the preferred aspects for carrying out the present invention are described using the vehicle provided with the engine 4 as the example. However, the vehicle according to the present invention may not be provided with the engine 4. For example, the vehicle according to the present invention may be provided with any drive source. For example, the vehicle according to the present invention may be provided with an electric motor or the like as a drive source.

The above embodiment describes the example using the water cooled four cycle parallel four-cylinder engine 4. However, the kind of the engine is not particularly limited in the present invention.

In the present invention, any drive force transmission mechanism which transmits the power from the drive shaft 23 to the rear wheel 19 may be used. The drive force transmission mechanism may be, for example, a chain, a drive shaft and a belt or the like.

The rider of the motorcycle 1 operates the clutch lever 24, and thereby the driving mechanism such as the oil pump may be operated. The power generated by the oil pump may be applied to the clutch release mechanism 86 to forcibly release the pressed contact state of the plate group 66.

While one or more embodiments have been described in connection with the figures hereinabove, the invention is not limited to these embodiments, but rather can be modified and adapted as appropriate. Thus, it is to be clearly understood that the above description was made only for purposes of an example and not as a limitation on the scope of the invention as claimed herein below.

What is claimed:

1. A motorcycle comprising:
    a vehicle body;
    a rear wheel provided on a rear side of the vehicle body;
    a drive source;
    a power transmission mechanism for connecting the drive source to the rear wheel;
    a centrifugal clutch arranged in the power transmission mechanism;
    a transmission having a plurality of gears and arranged in the power transmission mechanism;
    a handle provided on the vehicle body;
    an accelerator grip provided on a right side of the handle;
    a clutch lever provided on a left side of the handle and operatively connected to the centrifugal clutch for disengaging and engaging the centrifugal clutch;
    a shift pedal provided on a left side of the vehicle body and operatively connected to the transmission for changing a transmission gear ratio;
    a rear brake pedal provided on a right side of the vehicle body and operatively connected to the rear wheel for braking the rear wheel;
    a side stand provided on the vehicle body; and
    a rotation suppression mechanism configured to suppress the rotation of the rear wheel at least when the drive source is stopped, and after the motorcycle has been brought to a complete stop.

2. The motorcycle according to claim 1, wherein the rotation suppression mechanism has a pressing mechanism for pressing the centrifugal clutch into a connected state.

3. The motorcycle according to claim 2, wherein the centrifugal clutch comprises a clutch boss having a first plate, a clutch housing coaxial with the clutch boss and having a second plate facing the first plate, a pressure plate moved in the axial direction of the clutch boss to bring the first plate into contact with the second plate, a spring biasing the pressure plate in a direction in which the first plate is set apart from the second plate, and a centrifugal weight configured to receive a centrifugal force and in response move to the outside in a radial direction to move the pressure plate in a direction in which the first plate is brought into contact with the second plate, wherein the pressing mechanism has a mechanism for moving the pressure plate in the direction in which the first plate is brought into contact with the second plate.

4. The motorcycle according to claim 1, wherein the rotation suppression mechanism includes a rear wheel brake for braking the rear wheel.

5. The motorcycle according to claim 1, further comprising an interlocking mechanism for interlocking the side stand with the rotation suppression mechanism so that the rotation suppression mechanism is brought into an operative state when the side stand is extended and the rotation suppression mechanism is brought into an inoperative state when the side stand is stored.

6. The motorcycle according to claim 1, further comprising a switching member for switching between an operative state and an inoperative state of the rotation suppression mechanism.

7. The motorcycle according to claim 6, wherein the switching member is arranged on a left side of the handle.

8. The motorcycle according to claim 7, wherein at least a part of the switching member is located to the left of a right end of the clutch lever in at least one position corresponding to the operative or inoperative states.

9. The motorcycle according to claim 7, wherein the switching member is configured and positioned to be operated by a rider's left hand.

10. The motorcycle according to claim 9, wherein the switching member is configured and positioned to be operated by the thumb of the rider's left hand.

11. The motorcycle according to claim 7, further comprising a left side grip provided on a left side of the handle, wherein the switching member is located on a right side of a right end of the left side grip in the inoperative state of the rotation suppression mechanism, and wherein at least a part of the switching lever is located on a left side of a right end of the left side grip in the operative state of the rotation suppression mechanism.

12. The motorcycle according to claim 7, wherein the switching member comprises a lever constructed so that the rotation of the lever from a first position to a second position switches the rotation suppression mechanism between the operative and inoperative states, and the side stand is provided on a left side of the vehicle body, and wherein the motorcycle further comprises a handle lock mechanism for locking the handle in a state where the handle is rotated leftward to a position in which the vehicle body interferes with the rotation of the switching lever between the first and second positions.

13. A motorcycle, comprising:
    a drive source;
    a power transmission mechanism for operatively connecting the drive source to a rear wheel;
    a centrifugal clutch operatively arranged in the power transmission mechanism to automatically engage when the rotational speed of an input member is greater than or equal to an engagement rotational speed and automatically disengage when the rotational speed is less than the engagement speed;
    a transmission having a plurality of gears operatively arranged in the power transmission mechanism to provide a plurality of predefined gear ratios;
    a clutch actuation member operatively connected to the centrifugal clutch for manually disengaging and engaging the centrifugal clutch when the rotational speed of the input member is greater than or equal to the first rotational speed;

a shift pedal provided on a first side of a vehicle body, the shift pedal operatively connected to the transmission for changing the gear ratio;

a side stand provided on a side of the vehicle body; and a rotation suppression mechanism configured to suppress rotation of the rear wheel at least when the drive source is stopped, wherein the rotation suppression mechanism does not include a rear brake foot pedal, wherein the rotation suppression mechanism includes a pressing mechanism for pressing the centrifugal clutch into a connected state when the rotational speed of the centrifugal clutch is insufficient to cause the centrifugal clutch to automatically engage.

14. A motorcycle, comprising:

a drive source;

a power transmission mechanism for operatively connecting the drive source to a rear wheel;

a centrifugal clutch operatively arranged in the power transmission mechanism to automatically engage when the rotational speed of an input member is greater than or equal to an engagement rotational speed and automatically disengage when the rotational speed is less than the engagement speed;

a transmission having a plurality of gears operatively arranged in the power transmission mechanism to provide a plurality of predefined gear ratios;

a clutch actuation member operatively connected to the centrifugal clutch for manually disengaging and engaging the centrifugal clutch when the rotational speed of the input member is greater than or equal to the first rotational speed;

a shift pedal provided on a first side of a vehicle body, the shift pedal operatively connected to the transmission for changing the gear ratio;

a side stand provided on a side of the vehicle body;

a rotation suppression mechanism configured to suppress rotation of the rear wheel at least when the drive source is stopped, wherein the rotation suppression mechanism does not include a rear brake foot pedal; and an interlocking mechanism interlocking the side stand with the rotation suppression mechanism so that the rotation suppression mechanism is brought into an operative state when the side stand is extended relative to the vehicle body, and the rotation suppression mechanism being brought into an inoperative state when the side stand is stored relative to the vehicle body.

15. The motorcycle according to claim 13, wherein the centrifugal clutch comprises a clutch boss having a first plate, a clutch housing coaxial with the clutch boss and having a second plate facing the first plate, a pressure plate moved in the axial direction of the clutch boss to bring the first plate into contact with the second plate, a spring biasing the pressure plate in a direction in which the first plate is set apart from the second plate, and a centrifugal weight configured to receive a centrifugal force and in response move to the outside in a radial direction to move the pressure plate in a direction in which the first plate is brought into contact with the second plate, and wherein the pressing mechanism includes a mechanism for moving the pressure plate in the direction in which the first plate is brought into contact with the second plate.

16. The motorcycle according to claim 13, wherein the rotation suppression mechanism includes a mechanism for engaging a rear wheel brake.

17. A motorcycle, comprising:

a drive source;

a power transmission mechanism for operatively connecting the drive source to a rear wheel;

a centrifugal clutch operatively arranged in the power transmission mechanism to automatically engage when the rotational speed of an input member is greater than or equal to an engagement rotational speed and automatically disengage when the rotational speed is less than the engagement speed;

a transmission having a plurality of gears operatively arranged in the power transmission mechanism to provide a plurality of predefined gear ratios;

a clutch actuation member operatively connected to the centrifugal clutch for manually disengaging and engaging the centrifugal clutch when the rotational speed of the input member is greater than or equal to the first rotational speed;

a shift pedal provided on a first side of a vehicle body, the shift pedal operatively connected to the transmission for changing the gear ratio;

a side stand provided on a side of the vehicle body;

a rotation suppression mechanism configured to suppress rotation of the rear wheel at least when the drive source is stopped, wherein the rotation suppression mechanism does not include a rear brake foot pedal; and a switching member for switching between an operative state and an inoperative state of the rotation suppression mechanism.

18. The motorcycle according to claim 17, wherein the switching member is arranged on a left side of the handle.

19. The motorcycle according to claim 18, wherein at least a portion of the switching member is located to the left of a right end of the clutch lever in at least one position corresponding to the operative or inoperative states.

20. The motorcycle according to claim 19, wherein the switching member is configured and positioned to be operated by a rider's left hand.

21. The motorcycle according to claim 20, wherein the switching member is configured and positioned to be operated by the thumb of the rider's left hand.

22. The motorcycle according to claim 18, further comprising a left side grip provided on a left side of the motorcycle handle, wherein the switching member is located on a right side of a right end of the left side grip in the inoperative state of the rotation suppression mechanism, and wherein at least a portion of the switching lever is located on the left side of the right end of the left side grip in the operative state of the rotation suppression mechanism.

23. The motorcycle according to claim 17, wherein the switching member comprises a lever constructed so that the rotation of the lever from a first position to a second position switches the rotation suppression mechanism between the operative and inoperative states, and the side stand is provided on a left side of the vehicle body, and wherein the motorcycle further comprises a handle lock mechanism for locking the handle in a state where the handle is rotated leftward to a position in which the vehicle body interferes with the rotation of the switching lever between the first and second positions.

* * * * *